March 1, 1932. T. NORTON ET AL 1,847,359
CHUCK
Filed June 5, 1928 4 Sheets-Sheet 2
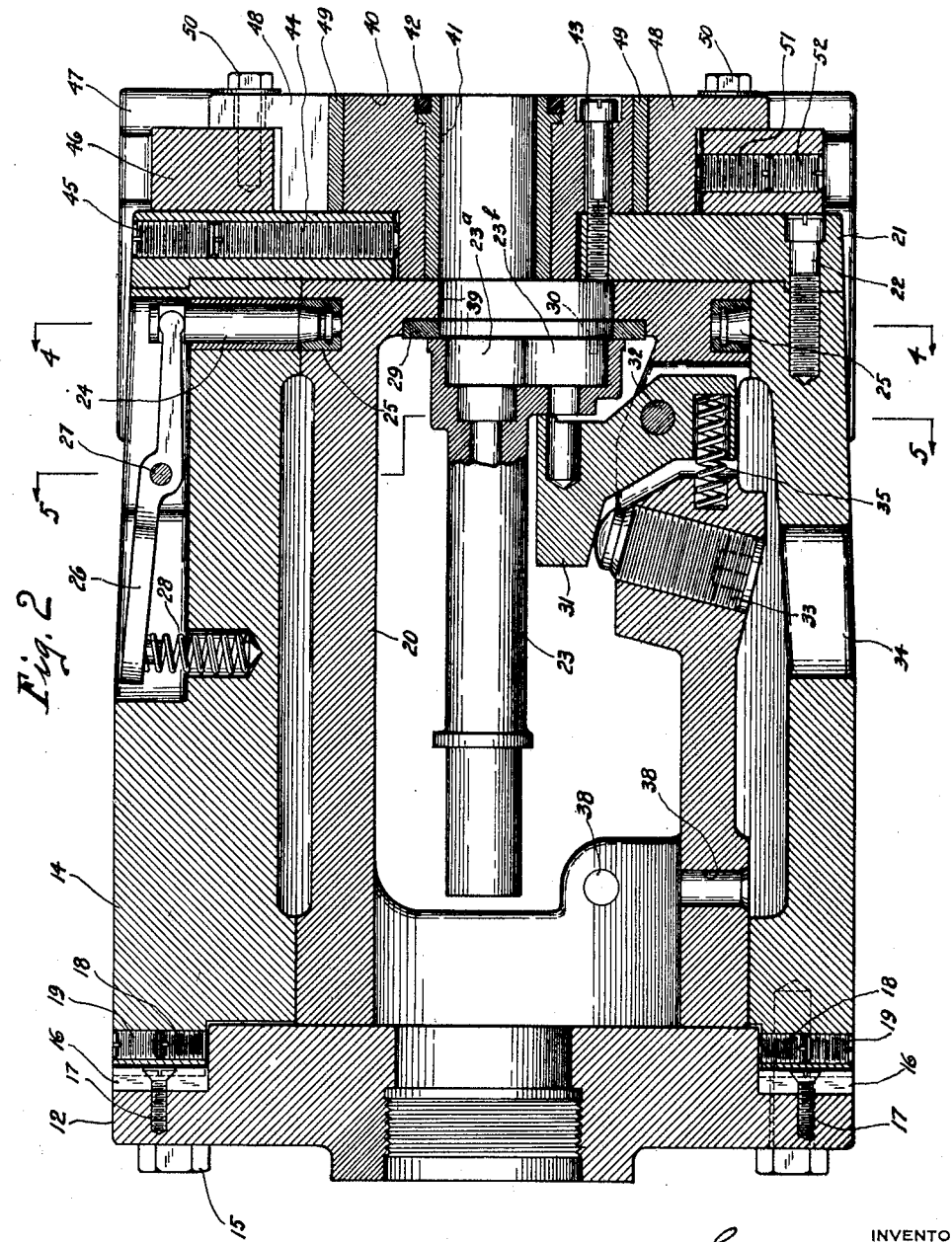
INVENTORS
Theodore Norton
Max E. Lange
BY Kwis Hudson & Kent
ATTORNEYS March 1, 1932. T. NORTON ET AL 1,847,359
CHUCK
Filed June 5, 1928 4 Sheets-Sheet 3
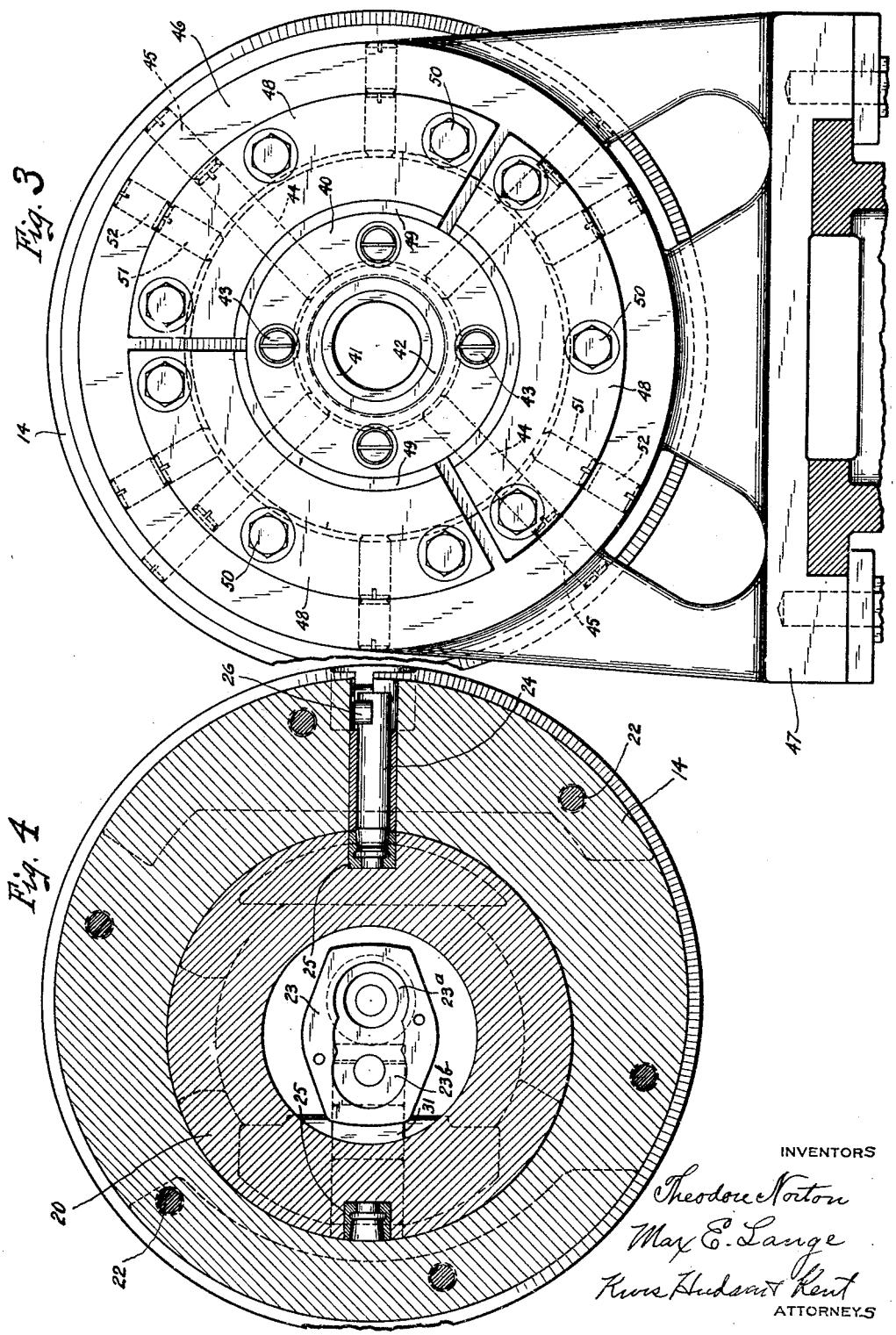
INVENTORS
Theodore Norton
Max E. Lange
Kurs Hudson Kent
ATTORNEYS March 1, 1932. T. NORTON ET AL 1,847,359
CHUCK
Filed June 5, 1928 4 Sheets-Sheet 4
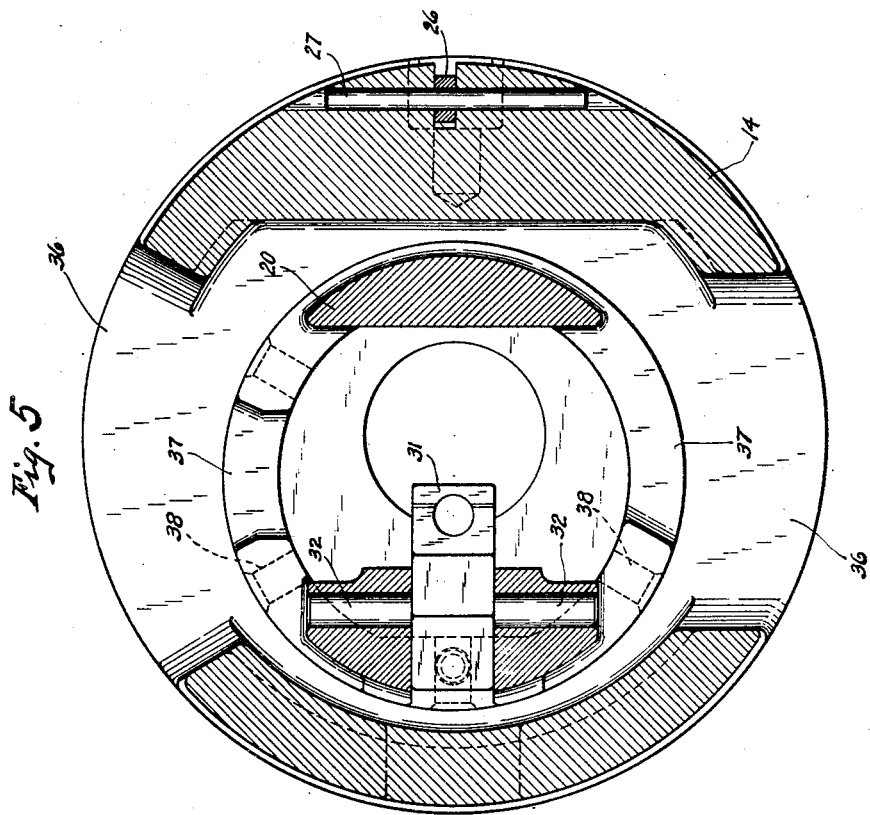
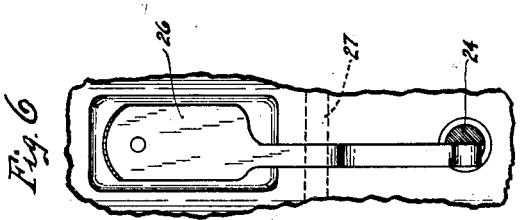
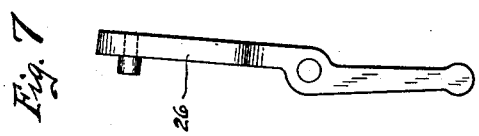
INVENTORS
Theodore Norton
Max E. Lange
BY Kwis Hudson + Kent
ATTORNEYS Patented Mar. 1, 1932

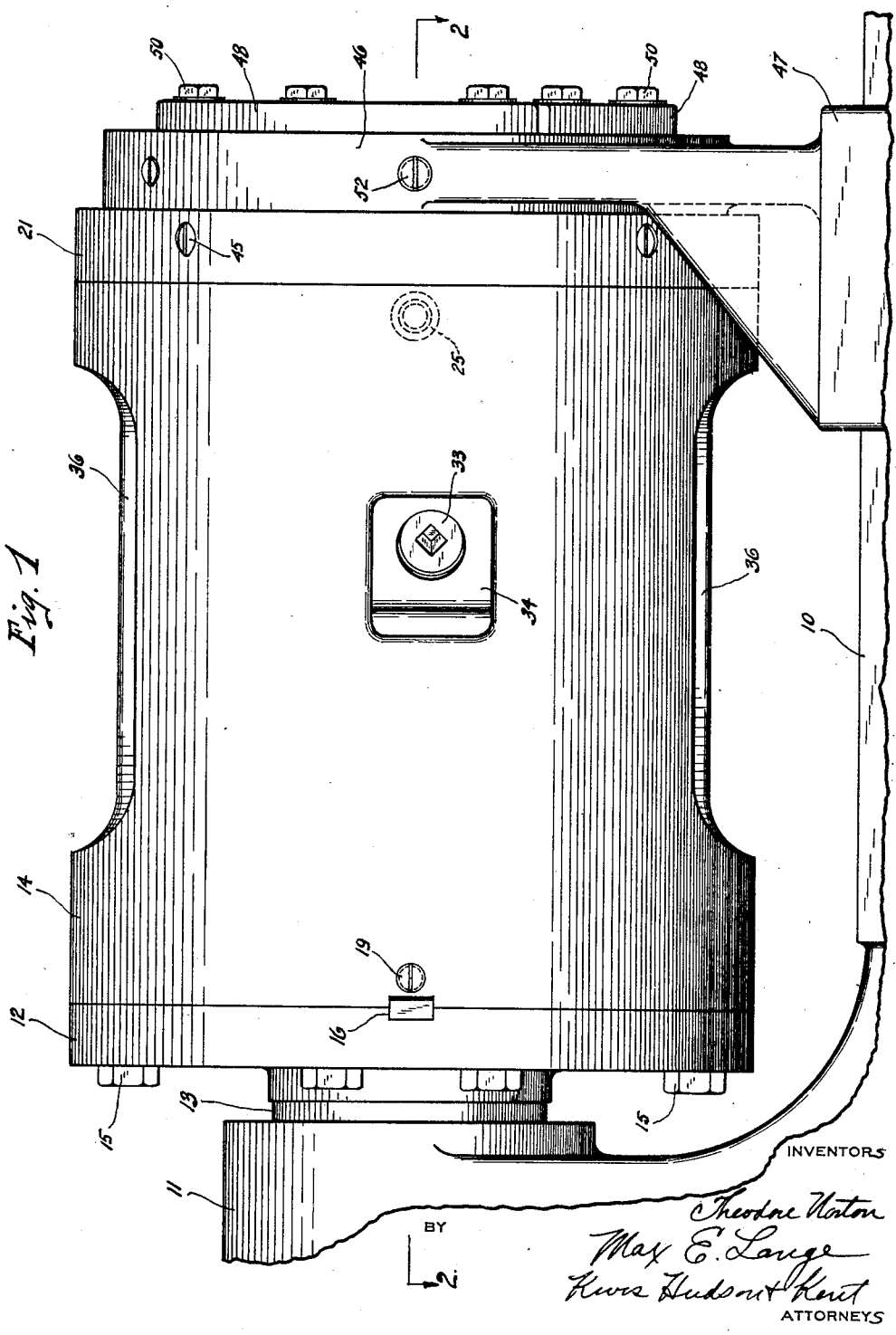

1,847,359

UNITED STATES PATENT OFFICE

THEODORE NORTON AND MAX E. LANGE, OF CLEVELAND HEIGHTS, OHIO, ASSIGNORS TO THE WARNER & SWASEY COMPANY, OF CLEVELAND, OHIO, A CORPORATION OF OHIO

CHUCK

Application filed June 5, 1928. Serial No. 282,965.

This invention relates to chucks for use on machine tools in the machining of work pieces.

The principal object of the invention is to provide a chuck adapted for the machining of work pieces where extreme accuracy is required.

A further object is to provide a chuck so constructed that a high degree of accuracy is obtainable by reason of a provision for accurately adjusting the work holding member of the chuck and also by the provision of novel piloting means for the tool holder.

A further object is to provide a chuck capable of adjustment both as to the work holder and as to the piloting means so that the work holder may be adjusted to accurately position the work with reference to the axis of the machine without affecting the proper functioning of the piloting portion of the chuck which is also adjustable with reference to the axis of the machine.

A further object is to provide a chuck having the characteristics and advantages mentioned above, but also adapted to be supported at its forward end by a steady rest which is capable of functioning as a support for the front end of the chuck body notwithstanding the adjustments, the parts being so arranged and corelated that relative adjustments may be made between the steady rest and the piloting portion of the chuck not only to compensate for the adjustment of the piloting portion, but also to compensate for wear and to facilitate the initial adjustment.

A further object is to attain the above objects with a chuck adapted to accommodate work pieces which are to be bored or otherwise machined on two or more centers, this chuck therefore embodying a work holder which may be adjusted within the chuck body or housing of the chuck to centralize different portions of the work pieces, suitable provision being made for locking the work holder to the housing in the different working positions of the former.

A still further object is to provide a chuck wherein the work is supported inside the chuck body with suitable provision for introducing the work pieces through the side of the chuck body.

The above and other objects are attained by the invention which may be summarized as consisting in certain novel combinations and arrangements of parts and details of construction which will be described in the specification and set forth in the appended claims.

In the accompanying sheets of drawings wherein there is shown an embodiment of the invention which operates very effectively, Fig. 1 is a side elevation of the improved chuck mounted in position on a machine tool, a portion of the head and bed of the latter being shown and the steady rest also being shown mounted on the bed in supporting relation with the front end of the chuck; Fig. 2 is a longitudinal sectional view of the same substantially on the line 2—2 of Fig. 1; Fig. 3 is an end view looking toward the front of the chuck with the bed in section; Fig. 4 is a transverse sectional view substantially on the line 4—4 of Fig. 2; Fig. 5 is a transverse sectional view substantially on the line 5—5 of Fig. 2; Fig. 6 is a plan view of the lever controlling a lock bolt for positioning the work holder in the housing, and showing also a small portion of the housing; and Fig. 7 is a side view of the lever of Fig. 6.

Referring to the drawings, we have shown the chuck applied to a machine tool which may be a lathe, a portion of the bed being shown at 10 and a portion of the head at 11.

The chuck proper includes an adapter 12 which is designed to be screwed onto the spindle in the usual manner, a portion of the spindle being shown at 13.

The chuck includes also a housing 14 which in the main is cylindrical in shape. It will be noted that the rear end of the housing overlaps a shouldered portion of the adapter, and here a provision is made for adjusting the housing laterally in one plane relative to the adapter. The housing is secured to the adapter by a series of axially disposed screws 15 which extend through suitable enlarged openings near the periphery of the adapter so that the lateral adjustment of the housing can be made. To guide the housing while being adjusted, the adapter is provided with diametrically opposite keys 16 secured to the adapter by screws 17. The adjustment is made very accurately along the keys 16 by turning radially disposed adjusting screws 18, these screws projecting through the housing into engagement with the shoulder portion of the adapter and after they have been adjusted to properly position the housing with reference to the adapter they are locked in place by locking screws 19. After the housing has thus been adjusted it is secured in fixed position on the adapter by tightening the screws 15, these screws having been loosened somewhat so that the adjustment may be made.

Inside the housing 14 is a work holder 20 which in this instance is substantially cylindrical in form and is rotatably supported in the housing 14. The housing 14 and the work holder 20 have at their ends bearing portions by which the work holder 20 is rotatably supported. The rear end of the work holder has a bearing on the front face of the adapter and the front end of the work holder has a bearing on a plate 21 which forms a part of the housing 14 and is secured thereto by screws 22, both the plate 21 and the housing 14 having interfitting shouldered portions. This plate 21 is formed separate from the housing simply for convenience in machining the housing and in assembly of the work holder.

The work holder 20 is hollow, as illustrated, to accommodate the work piece which is here designated 23. In this instance, the work piece is a pump bracket provided at its forward end with a housing portion having two substantially annular gear receiving chambers 23a and 23b which are adapted to be machined on different centers. To bring these portions in line with the center line of the machine, the work holder is made adjustable in the housing and in order that the adjustment which in this instance is a rotatable one may bring the portions 23a and 23b in line with the center of the machine, the work holder 20 is eccentrically mounted in the housing 14 as is obvious from Figs. 2, 4 and 5. That is to say, the annular bore within the housing to accommodate the work holder is eccentrically disposed so that when the work holder is in the position shown in Fig. 4 one portion of the work piece is centered and when the work holder is turned 180° from that position the other portion of the work piece is centered.

Provision is made for locking the work holder in each of its working positions and in this instance this consists of a lock bolt 24 supported for radial movement in the housing 14 and adapted to engage in either of the two sockets 25 provided in the periphery of the work holder, (see Figs. 2 and 4). In this case the lock bolt and the sockets 25 are at the forward ends of the housing and work holder respectively. Furthermore, since this particular work piece has two portions to be centered the sockets are 180° apart, but a work piece may be of such a nature that it is to have more than two portions to be centered and machined in which event the work holder will have a corresponding number of working positions and will be provided with a corresponding number of sockets to receive the inner end of the lock bolt.

The lock bolt is adapted to be retracted by a lever 26 pivoted on a pin 27 in a recessed portion of the housing, one end of the lever engaging the outer end of the lock bolt while the other end is engaged by a spring 28 seated in a socket of the housing and arranged to move the lever and lock bolt to locking position.

The work piece 23 is clamped against an annular hardened plate 29 secured on the inner face of the front end of the work holder. Preferably this plate has some inwardly projecting locating pins 30 that are adapted to engage in suitable locating openings formed on the front end of the work piece and the work piece is clamped against the plate 29 and thus held firmly in position (with the assistance of the locating pins 30) while the machining is being done, by a clamping lever 31 mounted on a bearing pin 32 supported by the work holder and it is held in work clamping and supporting relation by a screw 33 to which access may be had with a suitable wrench through an opening 34 formed in the housing 14, (see particularly Figs. 1 and 2).

A spring 35 seated partly in sockets of the lever and work holder serves to move the lever out of clamping position when the screw 33 is released from the lever 31.

The housing 14 is provided with a pair of fairly wide oppositely disposed openings 36 which extend substantially the full distance between the inner bearing portions of the housing, and the work holder is provided with a pair of similar openings 37 which extend substantially the full distance between its bearing portions. These openings are provided to permit the insertion or removal of the work piece and the openings 36 formed in the housing also permit the work holder to be turned from one working position to another. This can be done in various ways but in this instance this is done by means of a rod which is adapted to be extended through one or the other of the openings 36 into sockets 38 formed in the work holder these being illustrated in both Figs. 2 and 5, there being a sufficient number of these sockets to enable the work holder to be readily turned from one working position to another.

It might be here mentioned before passing from the description of the housing and work holder to the other parts to be referred to, that the front end of the work holder 20 and plate 29 have an annular opening 39 for the free passage of the tools to be used in machining the work piece, this opening being slightly greater than the maximum width of the portions 23a and 23b to be machined (see Fig. 2).

We provide in front of the housing of the chuck, so as to rotate therewith and so that it may be adjusted relative to the housing, means for piloting and supporting a tool or tool holder so that it will be held free of vibration and exactly central with respect to the axis of the machine. This piloting means consists of an outer pilot sleeve 40 shouldered at its inner end so as to engage both the outer face of the plate 21 and the front face of the work holder inside of the plate 21, there being a clearance between the latter and that portion of the sleeve which projects inwardly to the work holder. The pilot sleeve 40 supports a pilot bushing 41 held in place by a nut 42. The sleeve 40 and the bushing 41 have shouldered engaging portions which, with the assistance of the nut 42, support the bushing 41 centrally of the sleeve 40 so as to enable the bushing 41 to remain stationary in the sleeve 40 while the tool or tool holder projects through the bushing, the tool or tool holder being usually in the form of a cylindrical bar which has a close sliding fit in the bushing.

The pilot sleeve 40 is secured to the plate 21 by axially disposed screws 43 which extend through enlarged openings formed in the sleeve so as to permit the pilot sleeve to be adjusted so that it can be centralized with relation to the axis of rotation in the event that the adjustment of the housing relative to the adapter carries the pilot sleeve to an off-center position. The pilot sleeve may be adjusted to exactly centralized position after the screws 43 are loosened, by radially adjusting screws 44 which extend through the plate 21 into engagement with the inner portion of the pilot sleeve. After the screws 44 have been adjusted, they are locked in position by locking screws 45 and, of course, the screws 43 are then tightened to hold the pilot sleeve with its bushing in the centralized position to which it has been adjusted by the screws 44.

The pilot bushing 41 is preferably supported in the pilot sleeve 40 so that the bushing may be held stationary or substantially so when engaged by the tool or tool holder, i. e., so that the sleeve may rotate relative to the bushing when the machine operations are being performed, as it is much easier to retain lubricant on the engaging surfaces of the pilot sleeve and bushing than on the engaging surfaces of the bushing and tool or tool holder.

To insure accuracy of very high degree, a steady rest is provided for the front end of the chuck. This steady rest consists of a ring or annular supporting member 46 having a base 47 clamped to the ways of the bed 10—10 as best shown in Fig. 3, this steady rest preferably being so disposed as to engage the chuck on the front face of the plate 21 and so as to be in supporting relation with the pilot sleeve. Inasmuch as the steady rest with the supporting member carried by it is stationary when the chuck is rotated, provision for adjustment has been made to compensate for any relative adjustment between the pilot sleeve and the housing 14. Accordingly, the supporting part of the steady rest, i. e., the part which holds the front end of the chuck against lateral vibration, is formed in sections 48 which are adjustable radially on the steady rest ring 46. By reference particularly to Figs. 1, 2 and 3, it is seen that each section 48 is segmental in form and consists in this instance of an L-shaped body which is clamped against the outer face of the steady rest ring 46 and extends axially inward to the front face of the plate 21. Each of these sections has at its inner surface a hardened arc-shaped bearing portion 49 forming a bearing for the pilot sleeve 40 which is adapted to rotate within it, the several bearing portions 49 forming a sectional bearing sleeve. These sections 48 are secured to the front face of the steady rest ring 46 by means of axially disposed screws 50 which extend through enlarged openings of the sections 48 into the ring, the enlarged openings through which the screws extend permitting the sections to be adjusted radially to adapt the supporting portion of the steady rest to any adjustment which may be given to the pilot sleeve 40 and also to compensate for wear. The sections 48 may be moved radially inward into bearing or thrust relation with the pilot sleeve 40 by means of screws 51, and after the sections 48 are correctly positioned said screws 51 are locked in position by screws 52 (see Figs. 2 and 3). In this instance the supporting portion of the steady rest is formed in three sections each extending for substantially 120° around the pilot sleeve.

It will thus be seen that we have provided a chuck having a housing of any suitable length which is secured to the adapter for lateral adjustment in order that the work piece may be accurately positioned and supported with reference to the axis of the machine. Likewise, it will be seen that the housing has an eccentric inner bore receiving a cylindrically shaped work support which can be turned on the bearing portions of the bore to centralize two or more different portions of the work piece with provision for locking the work holder in any of its working positions. Likewise, it will be seen that there is provided additionally at the front of the chuck a rotating pilot support for the tool or tool holder which pilot support is capable of being centralized regardless of the lateral adjustment which is given to the housing, and still further, that there is provided for the front of the chuck a steady rest in which the front part of the chuck is adapted to rotate so that the front portion as well as the rear portion of the chuck is adequately supported, this steady rest being so formed and disposed that it will not interfere either with the adjustment of the housing or with the adjustment of the pilot sleeve inasmuch as its supporting portion is formed in radially adjustable sections which can be placed in accurate supporting relation with the front part of the chuck which is to rotate in it, thereby not only enabling the adjustments to be made but compensating for wear between the engaging stationary and rotating parts.

It will be apparent that since the inner bore of the pilot bushing and outer bearing surface of the pilot sleeve 40 are concentric, it is only necessary to bring the outer surface of the sleeve 40 to a central position with respect to the axis of rotation to center the bore of the bushing.

While we have shown the preferred construction, various parts of the chuck are susceptible of modification in form and construction and we therefore do not wish to be limited to the embodiments shown, but aim in our claims to cover all modifications which do not depart from the spirit and scope of the invention.

Having thus described our invention, we claim:

1. A chuck comprising an adaptor, a work support, a tool pilot, and means whereby either said adaptor, support or pilot may be adjusted relative to the others.

2. A chuck comprising a rotatable body having work supporting means and provided with a tool pilot at the front thereof, and a steady rest for the front part of the chuck.

3. A chuck comprising a rear part adapted to be connected to a spindle, a housing adapted to be secured thereto and adjustable laterally of the chuck axis, and a steady rest for supporting the front part of the chuck.

4. A chuck comprising a rotating body provided with a portion adjustable laterally of the chuck axis, and a steady rest engaging said portion.

5. A chuck comprising a rotatable body having a portion adjustable laterally of the chuck axis, and a steady rest having laterally adjustable portions engaging the same.

6. A chuck comprising a rear part adapted to be secured to a spindle, a housing secured thereto and adjustable laterally of the chuck axis, and a steady rest for the front part of the chuck having laterally adjustable bearing portions.

7. A chuck comprising a rear part adapted to be secured to a spindle, a housing secured thereto and adjustable laterally of the chuck axis, a laterally adjustable front portion secured to the housing, and a steady rest engageable with said laterally adjustable front portion.

8. A chuck comprising a rear part adapted to be secured to a spindle, a housing secured thereto, and adjustable laterally of the chuck axis, a laterally adjustable front portion secured to the housing, and a steady rest engageable with said laterally adjustable front portion and provided with laterally adjustable bearing portions.

9. A chuck comprising a rotatable body with work supporting means and provided at the front having a pilot sleeve with a pilot bushing rotatably supported therein.

10. A chuck comprising a rotatable body having work supporting means and provided with tool pilot means comprising a sleeve adjustable laterally of the chuck axis.

11. A chuck comprising a rotatable body having work supporting means and provided with tool pilot means comprising a sleeve adjustable laterally of the chuck axis having a pilot bushing rotatably supported therein.

12. A chuck comprising a rotatable body having work supporting means and provided at the front with a portion adjustable laterally of the chuck axis, and a steady rest for the front portion of the chuck having segmental bearing portions engaging said laterally adjustable portion of the chuck.

13. A chuck comprising a rotatable body provided with an adjustable work holding member adapted to be moved to different positions to centralize different portions of a work piece with reference to the axis of rotation, and a steady rest for supporting the front part of the chuck.

14. A chuck having a rear part adapted to be supported by a spindle, a work holding member adapted to be adjusted to different positions to centralize different portions of a work piece with reference to the axis of rotation, and a steady rest adapted to engage the front end of the chuck.

15. A chuck having a rear part adapted to be supported by a spindle, a steady rest engaging the front part of the chuck, and an adjustable work supporting member supported by the chuck between the spindle and the steady rest and adapted to be adjusted circumferentially to different positions.

16. A chuck comprising a rotatable body, a work holder supported by said body and adjustable laterally of the chuck axis, and a pilot portion in advance of the work holder.

17. A chuck comprising a rotatable body having an eccentric bore, a work holder engaging said bore and adapted to be secured in different working positions therein, and a tool pilot member carried by said body in advance of the work holder.

18. A chuck comprising a rotatable body having an eccentric bore, a work holder engaging said bore and adapted to be secured in different working positions therein, a tool pilot means carried by said body in advance of the work holder, and a steady rest for the front part of the chuck.

19. A chuck comprising a chuck body having an eccentric bore, a work holder engaging the bore and adapted to be secured in different working positions, a tool pilot member carried by the body in advance of said work holder, and a steady rest engaging the pilot member.

20. A chuck comprising an adapter, a housing adjustably secured thereto and having an eccentric bore, a work holder engaging the bore and adjustable to different positions therein, an adjustable tool pilot member carried by the housing, and a steady rest having adjustable portions engaging the pilot member.

21. A chuck comprising an elongated rotatable body having a circumferentially adjustable member therein with work holding means comprising a clamping plate surrounding the axis of rotation adjacent the front end of the body, and means for supporting the work by clamping the same against said plate, both the clamping plate and said means being carried by said member.

22. A chuck comprising a housing having an eccentric bore, and a work holder engaging the bore adapted to be turned therein, the housing having one or more loading and unloading openings between the front and rear ends thereof.

23. A chuck comprising a rotatable housing having an eccentric bore with axially spaced bearing portions at the front and rear thereof, and a work holder having axially spaced front and rear bearing portions engaging the said bearing portions of the eccentric bore, said work holder being adapted to be turned to different positions within the housing.

24. A chuck comprising a rotatable housing having an eccentric bore with axially spaced bearing portions at the front and rear thereof, a work holder having axially spaced front and rear bearing portions engaging the said bearing portions of the eccentric bore, said work holder being adapted to be turned to different positions within the housing, said housing and the work holder having loading and unloading openings extending between the front and rear bearing portions.

25. A chuck comprising an adapter adapted to be secured to a spindle, a chuck body carried by the adapter and adjustable thereon laterally of the chuck axis, said chuck body having an eccentric bore, and a work holder rotatably supported by the chuck body in said bore.

In testimony whereof, we hereunto affix our signatures.

THEODORE NORTON.
MAX E. LANGE.